US012699222B2

(12) United States Patent
Zhao et al.

(10) Patent No.: US 12,699,222 B2
(45) Date of Patent: Aug. 4, 2026

(54) ELECTRONIC DEVICE AND DISPLAY INCLUDING A BACK PLATE WITH NOTCH

(71) Applicant: Honor Device Co., Ltd., Shenzhen (CN)

(72) Inventors: Qi Zhao, Shenzhen (CN); Tenghe Zhang, Shenzhen (CN); Xiaokang Xu, Shenzhen (CN); Yuelin Wang, Shenzhen (CN); Nan Zhou, Shenzhen (CN); Xiao Wu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 78 days.

(21) Appl. No.: 18/843,538

(22) PCT Filed: Apr. 21, 2023

(86) PCT No.: PCT/CN2023/089850
§ 371 (c)(1),
(2) Date: Sep. 3, 2024

(87) PCT Pub. No.: WO2024/021701
PCT Pub. Date: Feb. 1, 2024

(65) Prior Publication Data
US 2025/0180799 A1      Jun. 5, 2025

(30) Foreign Application Priority Data
Jul. 29, 2022    (CN) .......................... 202222000605.3

(51) Int. Cl.
| | |
|---|---|
| *G06F 1/16* | (2006.01) |
| *F21V 8/00* | (2006.01) |
| *G02B 6/00* | (2006.01) |

(52) U.S. Cl.
CPC ......... *G02B 6/0081* (2013.01); *G02B 6/0055* (2013.01)

(58) Field of Classification Search
CPC .. G02B 6/0081; G02B 6/0055; G02B 6/0088; G02F 1/133314; G02F 1/133509; G02F 1/133308; G06F 1/16
See application file for complete search history.

(56) References Cited

U.S. PATENT DOCUMENTS

| | | | | |
|---|---|---|---|---|
| 5,335,147 A | * | 8/1994 | Weber .................. | H05K 7/1461 174/359 |
| 6,361,357 B1 | * | 3/2002 | Stillwell ............ | H01R 13/6691 362/23.15 |

(Continued)

FOREIGN PATENT DOCUMENTS

| | | |
|---|---|---|
| CN | 205160659 U | 4/2016 |
| CN | 206193608 U | 5/2017 |

(Continued)

*Primary Examiner* — Rockshana D Chowdhury
(74) *Attorney, Agent, or Firm* — Leydig, Voit & Mayer, Ltd.

(57) ABSTRACT

This application relates to the field of electronic device technologies, and specifically, to a display module and an electronic device. The display module includes a back plate, a reflection sheet, a light guide plate, and a light shielding member. A direction in which the reflection sheet points to the light guide plate is a light emitting direction of the display module, and in the light emitting direction, the reflection sheet is disposed between the back plate and the light guide plate. In the light emitting direction, the back plate is disposed above a USB connector, and a notch is disposed at a location that is on the back plate and that corresponds to the USB connector. The light shielding member is connected to the back plate and wraps the notch.

18 Claims, 12 Drawing Sheets

(56) References Cited

U.S. PATENT DOCUMENTS

| | | | | |
|---|---|---|---|---|
| 8,864,515 | B2 * | 10/2014 | Oh | H01R 13/465 |
| | | | | 439/910 |
| 9,928,762 | B2 * | 3/2018 | Franklin | H05K 1/0274 |
| 10,606,109 | B2 * | 3/2020 | Zhang | G02F 1/133308 |
| 10,613,270 | B2 * | 4/2020 | Jeon | H05K 1/118 |
| 10,877,207 | B1 * | 12/2020 | Li | G02B 6/0088 |
| 11,327,352 | B2 * | 5/2022 | Lee | G02F 1/13452 |
| 11,366,264 | B2 * | 6/2022 | Wang | G02B 5/003 |
| 11,422,299 | B1 * | 8/2022 | Ebihara | G02B 6/006 |
| 12,196,997 | B2 * | 1/2025 | Qiu | G06F 3/0412 |
| 12,287,508 | B1 * | 4/2025 | Shao | F21V 23/0485 |
| 2004/0253859 | A1 * | 12/2004 | Hirata | H01R 13/6485 |
| | | | | 439/181 |
| 2010/0007814 | A1 * | 1/2010 | Kim | G02B 6/0083 |
| | | | | 345/87 |
| 2012/0106197 | A1 * | 5/2012 | Lai | G02B 6/0031 |
| | | | | 156/305 |
| 2013/0077026 | A1 * | 3/2013 | Seo | G02F 1/133608 |
| | | | | 362/382 |
| 2014/0176863 | A1 * | 6/2014 | Oohira | G02F 1/133528 |
| | | | | 349/62 |
| 2014/0176872 | A1 * | 6/2014 | Miyazaki | G02F 1/133615 |
| | | | | 349/65 |
| 2015/0002785 | A1 * | 1/2015 | Huang | G02B 6/0066 |
| | | | | 362/633 |
| 2016/0320545 | A1 | 11/2016 | Hirayama et al. | |
| 2017/0082794 | A1 * | 3/2017 | Jeon | G02B 6/009 |
| 2018/0173031 | A1 * | 6/2018 | Yu | G02F 1/133308 |
| 2018/0210267 | A1 * | 7/2018 | Zhang | G02B 5/00 |
| 2021/0181400 | A1 * | 6/2021 | Lin | G02B 6/0023 |
| 2021/0263212 | A1 * | 8/2021 | Li | G02F 1/133308 |
| 2021/0405284 | A1 * | 12/2021 | Gu | G02B 6/0083 |
| 2022/0011624 | A1 * | 1/2022 | Wu | G09F 9/301 |
| 2022/0100983 | A1 * | 3/2022 | Jia | G02B 6/0083 |
| 2024/0345436 | A1 * | 10/2024 | Zhu | G02F 1/133314 |
| 2024/0377571 | A1 * | 11/2024 | Qiu | G02F 1/1335 |
| 2025/0180799 | A1 * | 6/2025 | Zhao | G02B 6/0081 |

FOREIGN PATENT DOCUMENTS

| | | |
|---|---|---|
| CN | 110579906 A | 12/2019 |
| CN | 112339382 A | 2/2021 |
| CN | 112578860 A | 3/2021 |
| CN | 113452812 A | 9/2021 |
| CN | 218383546 U | 1/2023 |

* cited by examiner

ELECTRONIC DEVICE AND DISPLAY INCLUDING A BACK PLATE WITH NOTCH

CROSS-REFERENCE TO RELATED APPLICATIONS

This application is a national stage of International Application No. PCT/CN2023/089850, filed on Apr. 21, 2023, which claims priority to Chinese Patent Application No. 202222000605.3, filed on Jul. 29, 2022, both of which are hereby incorporated by reference in their entireties.

TECHNICAL FIELD

This application relates to the field of electronic device technologies, and in particular, to a display module and an electronic device.

BACKGROUND

With the development of science and technology and people's pursuit of aesthetics, lightness and thinness have become one of mainstream development directions of tablet products. Because the tablet product uses a standardized universal serial bus (USB)-type C connector, a thickness of the tablet product remains unchanged. To reduce a thickness of an entire device, a security gap between the USB-type C connector and a display module is inevitably compressed, and consequently, a potential risk of poor display exists during use of the tablet product.

SUMMARY

Embodiments of this application provide a display module. A back plate that is in the display module and that is directly above a USB-type C connector is provided with a notch to increase avoidance space in a Z direction, so that a thickness of an entire device is reduced while a security gap is ensured. A light shielding member is added at the notch on the back plate to wrap the notch, to prevent a foreign object from entering the display module and further shield light.

To achieve the foregoing objective, the following technical solutions are used in embodiments of this application.

According to a first aspect, an embodiment of this application provides a display module, including a back plate, a reflection sheet, a light guide plate, and a light shielding member. A direction in which the reflection sheet points to the light guide plate is a light emitting direction of the display module, and in the light emitting direction, the reflection sheet is disposed between the back plate and the light guide plate. In the light emitting direction, the back plate is disposed above a USB connector, and a notch is disposed at a location that is on the back plate and that corresponds to the USB connector. The light shielding member is connected to the back plate and wraps the notch.

The back plate that is in the display module and that is directly above the USB-type C connector is provided with a notch to increase avoidance space in a Z direction, so that a thickness of an entire device is reduced while a security gap is ensured. The light shielding member is added at the notch on the back plate to wrap the notch, to prevent a foreign object from entering the display module and further shield light.

In a possible implementation of the first aspect, the light shielding member includes a first part and a second part that are connected, the first part is connected to a side that is of the back plate and that is away from the reflection sheet, and the second part is connected to a side surface of the display module, to wrap the notch to prevent a foreign object from entering the display module from the notch.

In a possible implementation of the first aspect, the light shielding member is a black Mylar sheet.

In a possible implementation of the first aspect, a convex lug is disposed at the notch on the back plate, and the convex lug is configured to support the light guide plate in the light emitting direction.

In a possible implementation of the first aspect, the convex lug is further configured to support the reflection sheet in the light emitting direction.

In a possible implementation of the first aspect, the notch includes a first sidewall, a bottom wall, and a second sidewall that are sequentially connected;

the bottom wall extends in a first direction;

the first sidewall and the second sidewall are disposed opposite to each other in the first direction and separately extend in a second direction, the first direction and the second direction intersect, and the light emitting direction is separately perpendicular to the first direction and the second direction; and the convex lug extends in the first direction, and protrudes from the bottom wall in the second direction.

In a possible implementation of the first aspect, in the first direction, the convex lug is separately spaced apart from the first sidewall and the second sidewall.

In a possible implementation of the first aspect, intervals between the convex lug and the first sidewall and the second sidewall are used to avoid a compression structure of the USB connector.

In a possible implementation of the first aspect, in the second direction, the convex lug is separately shorter than the first sidewall and the second sidewall, to avoid the compression structure of the USB connector.

In a possible implementation of the first aspect, a protrusion is disposed at a location that is on the reflection sheet and that corresponds to the notch, and in the light emitting direction, projections of the reflection sheet and the protrusion at least partially cover a projection of the notch.

In a possible implementation of the first aspect, in the light emitting direction, the projections of the reflection sheet and the protrusion completely cover the projection of the notch.

In a possible implementation of the first aspect, a white PET layer is disposed at a location that is on the light shielding member and that corresponds to the notch, and in the light emitting direction, a projection of the white PET layer at least partially covers a projection of the notch.

In a possible implementation of the first aspect, in the light emitting direction, the projection of the white PET layer in completely covers the projection of the notch.

According to a second aspect, an embodiment of this application provides an electronic device, including: a USB connector, including a compression structure; and the display module described in any of the possible implementations of the first aspect, where in the light emitting direction of the display module, the back plate of the display module is disposed above the USB connector, and the notch is located above the compression structure of the USB connector.

DESCRIPTION OF EMBODIMENTS

The following describes specific implementations of this application in detail with reference to the accompanying drawings.

Embodiments of this application provide a display module. A back plate that is in the display module and that is directly above a USB-type C connector is provided with a notch to increase avoidance space in a Z direction, so that a thickness of an entire device is reduced while a security gap is ensured.

This application provides a display module used in an electronic device, and the display module uses a design in which a back plate is provided with a notch to avoid a compression structure of a USB connector (for example, USB type C connector). Specifically, the electronic device includes but is not limited to an electronic device with a display module (for example, an LCD module) and a USB connector, such as a mobile phone, a tablet computer (tablet personal computer), an e-book reader, a laptop computer, a personal digital assistant (PDA), a personal computer, a notebook computer (notebook), a vehicle-mounted device, a wearable device (for example, a watch), or a box.

For ease of description, an example in which the electronic device is a tablet computer is used for description in the following, and an example in which a USB connector is a USB type C connector is used for description. The following describes the tablet computer in this application by using specific embodiments.

Figure 1:
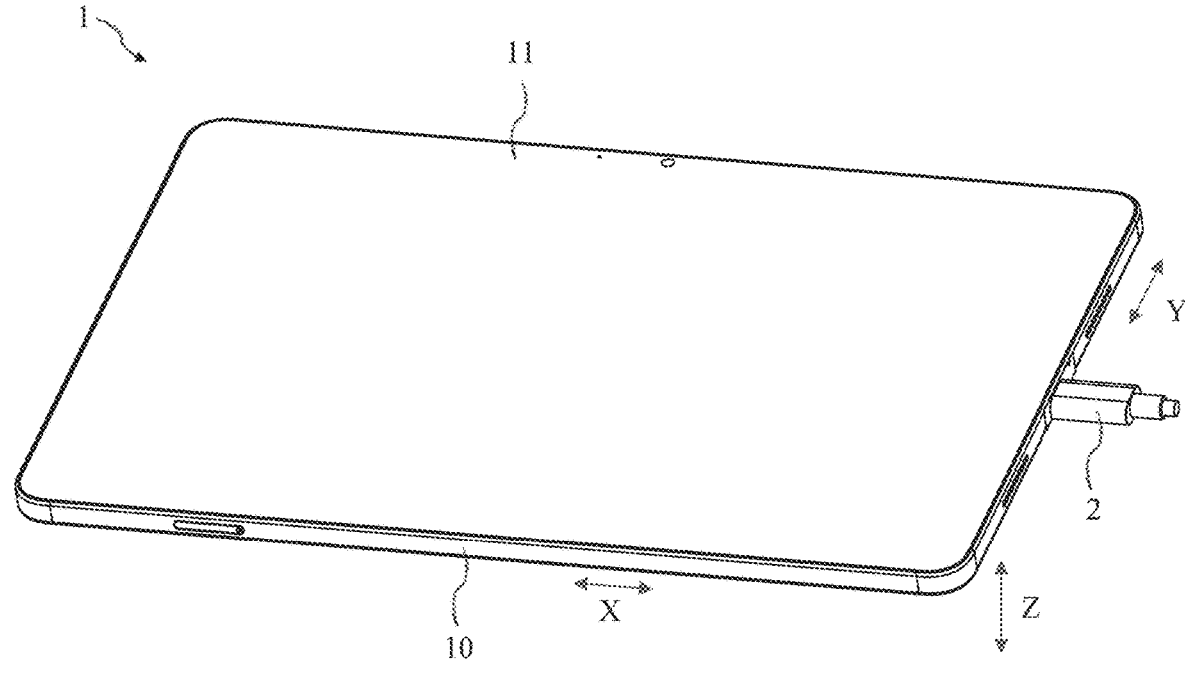
FIG. 1 is a first three-dimensional diagram of a tablet computer according to some embodiments of this application.
Figure 2:
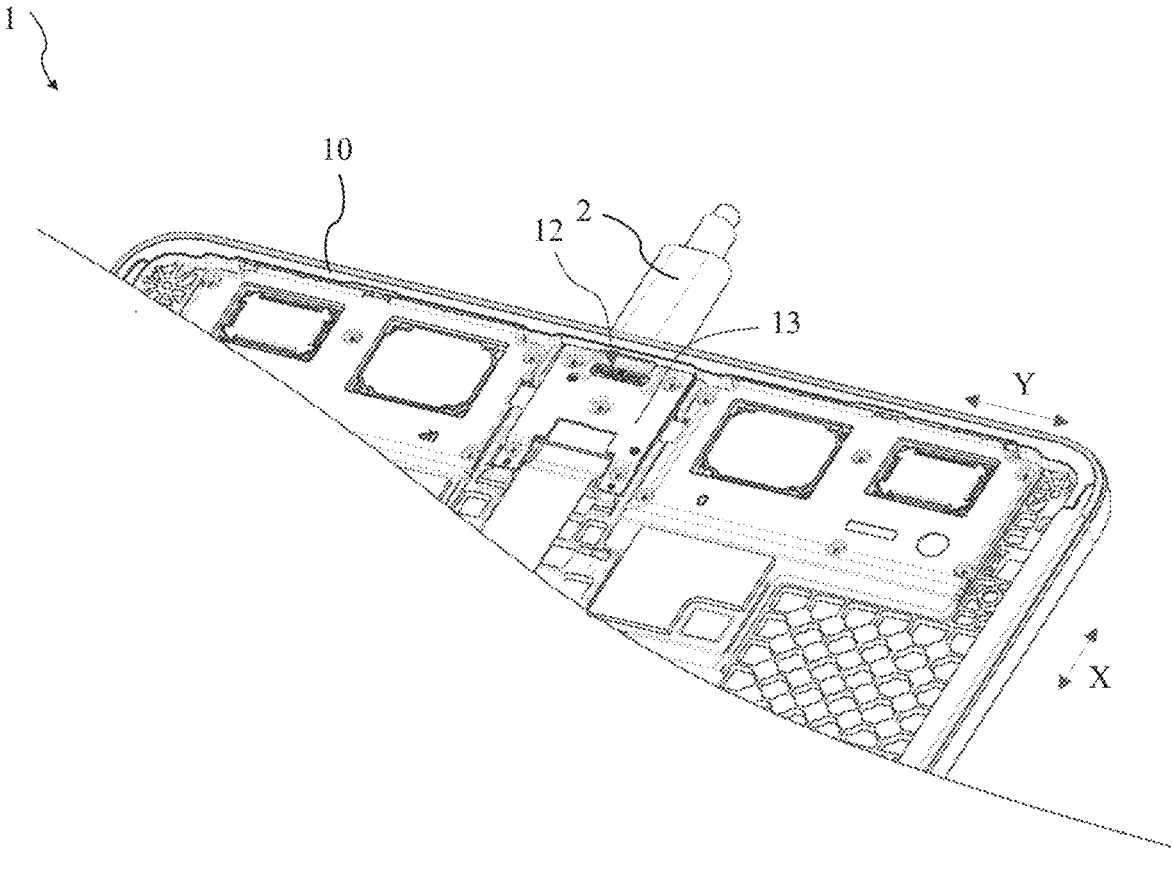
FIG. 2 is a partially enlarged view of a tablet computer from a perspective of a top view according to some embodiments of this application.
Figure 3A:
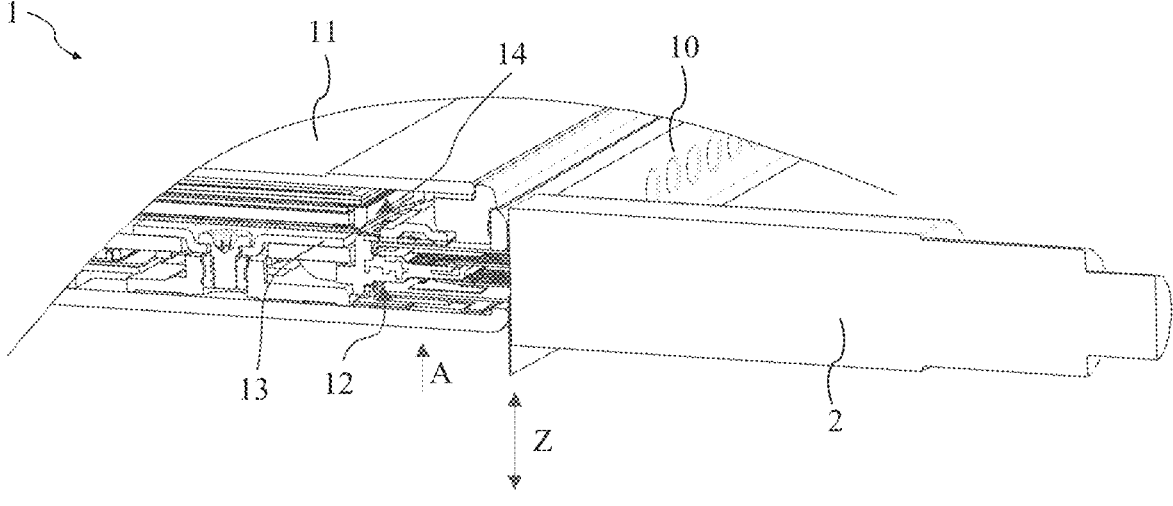
FIG. 3A is a first partially enlarged view of a tablet computer from a perspective of a sectional view according to some embodiments of this application.
Figure 3B:
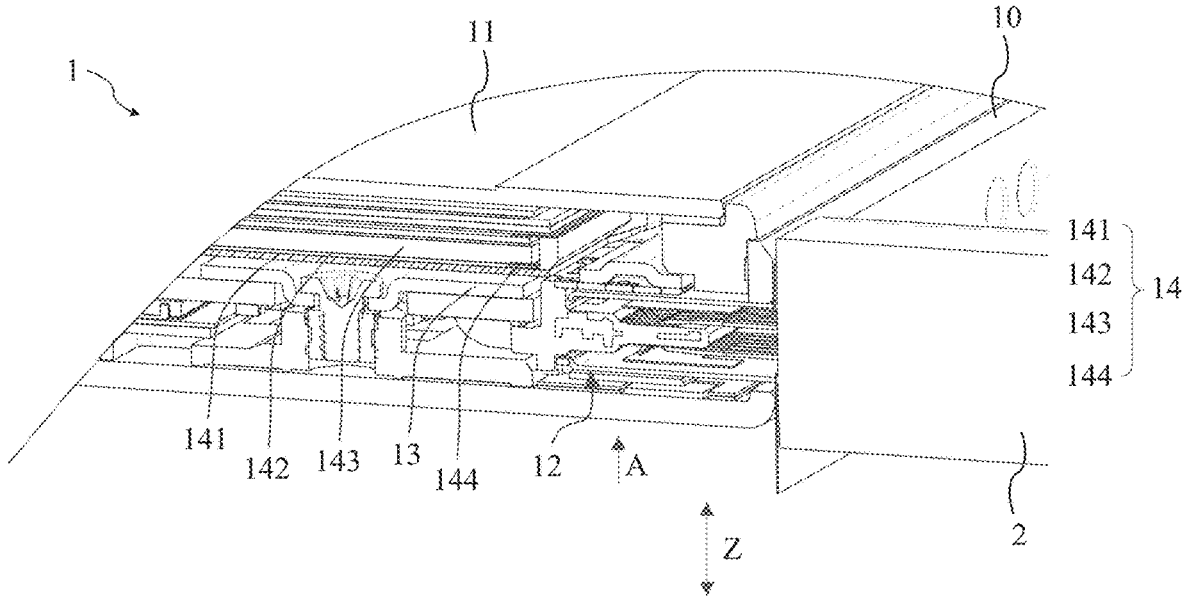
FIG. 3B is a second partially enlarged view of a tablet computer from a perspective of a sectional view according to some embodiments of this application.

FIG. 1 is a first three-dimensional diagram of a tablet computer 1 according to an embodiment of this application, FIG. 2 is a partially enlarged view (a display module 11 is not shown) of the tablet computer 1 from a perspective of a top view according to an embodiment of this application, FIG. 3A is a first partially enlarged view of the tablet computer 1 from a perspective of a sectional view according to an embodiment of this application, and FIG. 3B is a second partially enlarged view of the tablet computer 1 from a perspective of a sectional view according to an embodiment of this application.

Referring to FIG. 1, the tablet computer 1 in this embodiment of this application includes a middle frame 10 and a display module 11. For example, the middle frame 10 is in a cuboid shape. To be specific, a size of the middle frame 10 in a length direction (shown by an X direction in FIG. 1) is greater than a size of the middle frame 10 in a width direction (shown by a Y direction in FIG. 1). The display module 11 is disposed in the middle frame 10 in a thickness direction (shown by a Z direction in FIG. 1) of the tablet computer 1. For example, a length direction, a width direction, and the thickness direction of the tablet computer 1 are perpendicular to each other.

The display module 11 may be a flexible screen or a hard screen. This is not limited herein. In this embodiment of this application, the middle frame 10 and the display module 11 may be bonded together by using a sticky material (for example, a foam tape). However, a manner of connecting the middle frame 10 and the display module 11 is not limited to using the sticky material, provided that assembly can be implemented.

As shown in FIG. 2, a USB type C connector 12 is disposed inside an end in the length direction of the tablet computer 1, and the USB type C connector 12 is mounted in the middle frame 10 by using a compression structure 13 (for example, a compression steel sheet and a bolt). The USB type C connector 12 is used for a USB plug 2 to plug in, and may implement functions such as charging or externally connected to a headset.

As shown in FIG. 3A and FIG. 3B, the display module 11 of the tablet computer 1 includes a backlight assembly 14, and the backlight assembly 14 in the display module 11 is disposed directly above the USB type C connector 12 in the thickness direction of the tablet computer 1. For example, the backlight assembly 14 in the display module 11 in this embodiment of this application includes a back plate 141, a reflection sheet 142, and a light guide plate 143 that are stacked in the thickness direction. A direction in which the reflection sheet 142 points to the light guide plate 143 is a light emitting direction (shown by an A direction in FIG. 3A and FIG. 3B) of the display module 11, and in the light emitting direction, the reflection sheet 142 is disposed between the back plate 141 and the light guide plate 143. For example, the light guide plate 143 is adhered to the back plate 141 by using a fastening tape 144. In the light emitting direction, the back plate 141 is disposed directly above the compression structure 13 of the USB type C connector 12. The display module 11 in this embodiment of this application can reflect light upward in the light emitting direction, so that the display module 11 displays a corresponding pattern. For example, the light emitting direction is separately perpendicular to the length direction and the width direction, that is, the light emitting direction is parallel to the thickness direction.

Figure 4A:
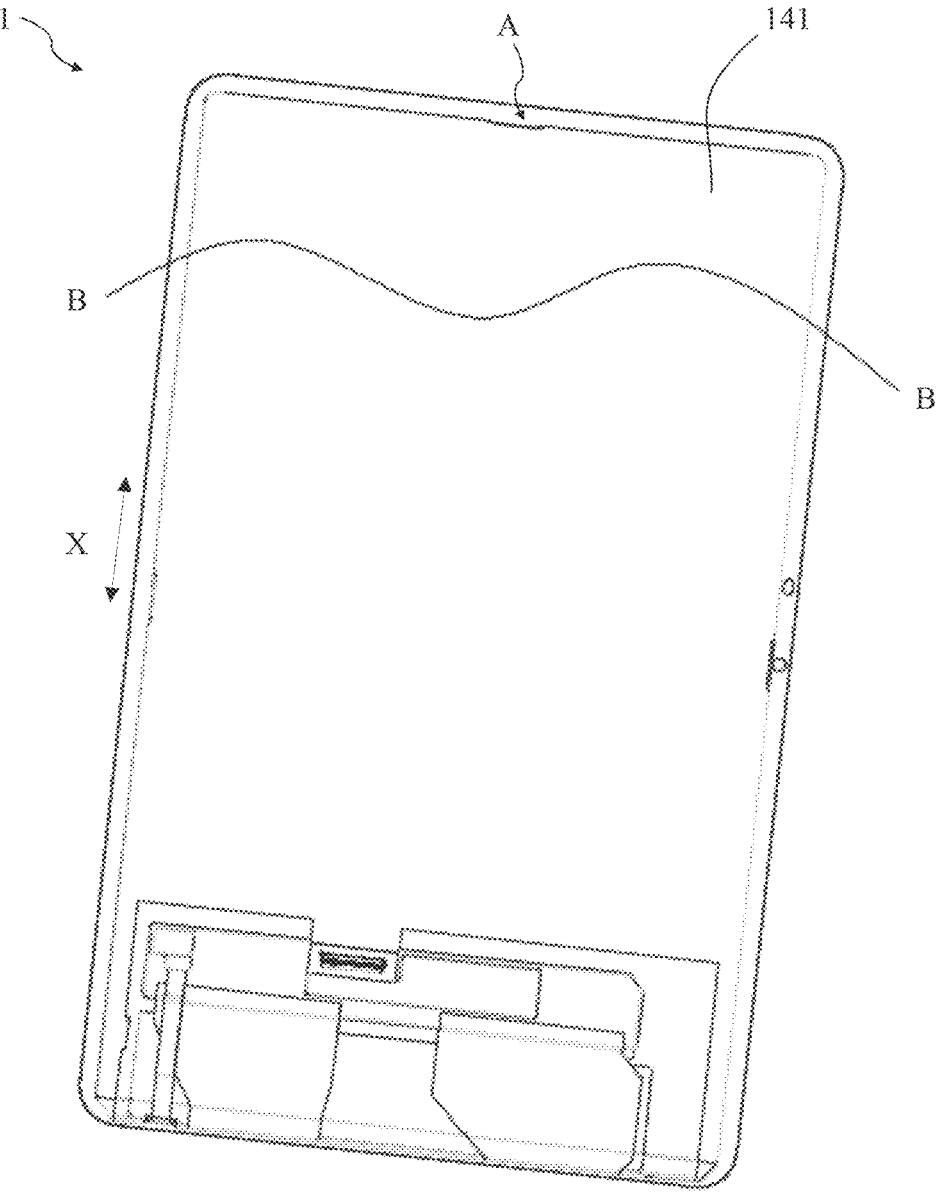
FIG. 4A is a first three-dimensional diagram of a display module of a tablet computer according to some embodiments of this application.
Figure 4B:
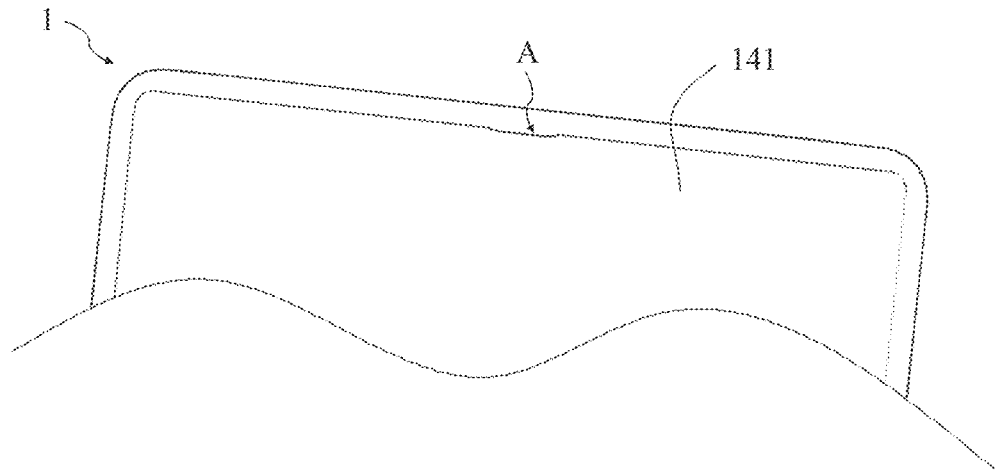
FIG. 4B is a first partially enlarged view taken along a B-B part in FIG. 4A according to some embodiments of this application.

FIG. 4A is a three-dimensional diagram of the display module of the tablet computer 1 according to an embodiment of this application, FIG. 4A is a back view of the display module 11, and FIG. 4B is a partially enlarged view at a location that is on the back plate 141 and that corresponds to the USB type C connector 12 in FIG. 4A. As shown in FIG. 4B, the location that is on the back plate 141 and that corresponds to the USB type C connector 12 covers the compression structure 13 of the type C connector 12 (references may also be made to FIG. 3B).

Because the tablet computer 1 uses the standardized USB-type C connector 12, a thickness size of the USB-type C connector 12 cannot be changed (reduced). To reduce a thickness of an entire device, a security gap between the compression structure 13 of the USB-type C connector 12 and the display module 11 is inevitably compressed, and consequently, a potential risk of poor display exists during use of the tablet computer 1.

Figure 5A:
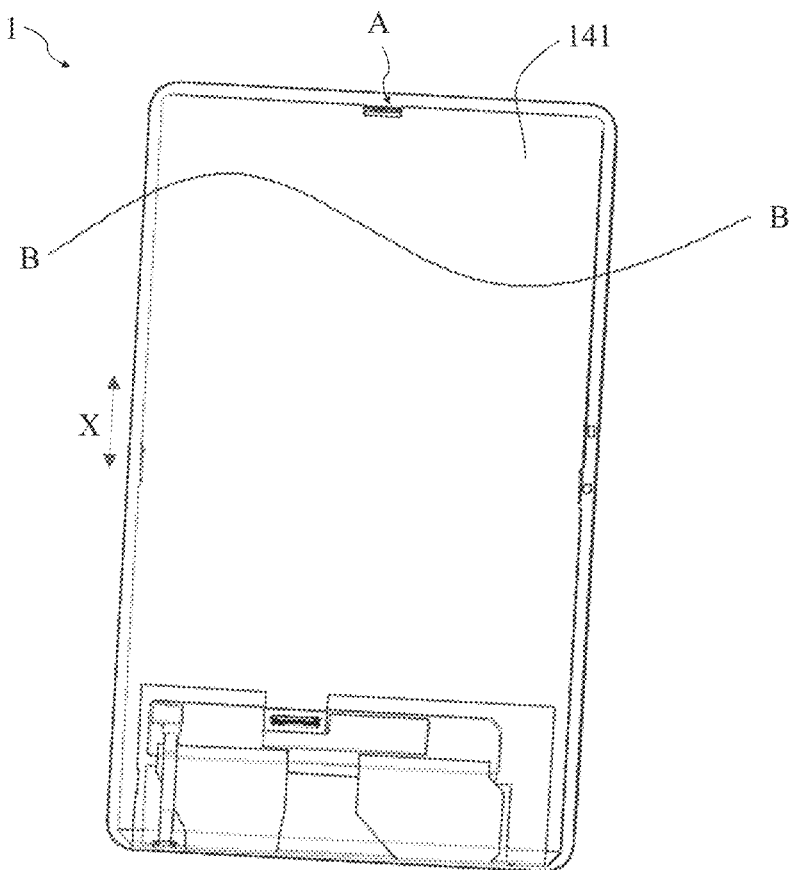
FIG. 5A is a second three-dimensional diagram of a display module of a tablet computer according to some embodiments of this application.
Figure 5B:
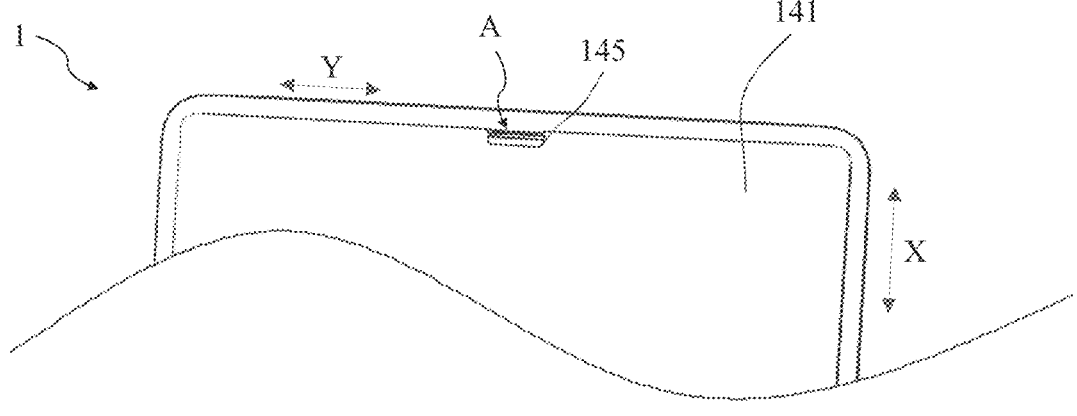
FIG. 5B is a second partially enlarged view taken along a B-B part in FIG. 5A according to some embodiments of this application.

Therefore, referring to FIG. 5A and FIG. 5B, in this embodiment of this application, the back plate 141 that is in the display module 11 and that is directly above the USB-type C connector 12 is provided with a notch. Specifically, a notch 145 is provided at a location (shown by an A location in FIG. 5A and FIG. 5B) that is on the back plate 141 and that corresponds to the compression structure 13 of the USB-type C connector 12. After this disposing, avoidance space between the compression structure 13 of the USB-type C connector 12 and the backlight assembly 14 in the Z direction (the thickness direction) is increased, that is, avoidance space between the compression structure 13 and the display module 11 in the Z direction (the thickness direction) is increased, so that a thickness of an entire device is reduced while a security gap is ensured.

Figure 6A:
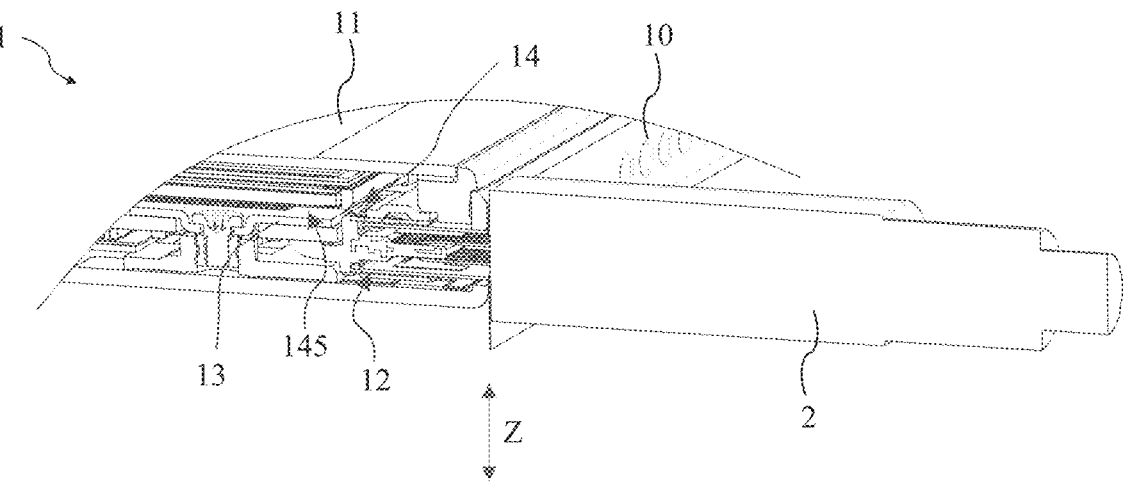
FIG. 6A is a third partially enlarged view of a tablet computer from a perspective of a sectional view according to some embodiments of this application.
Figure 6B:
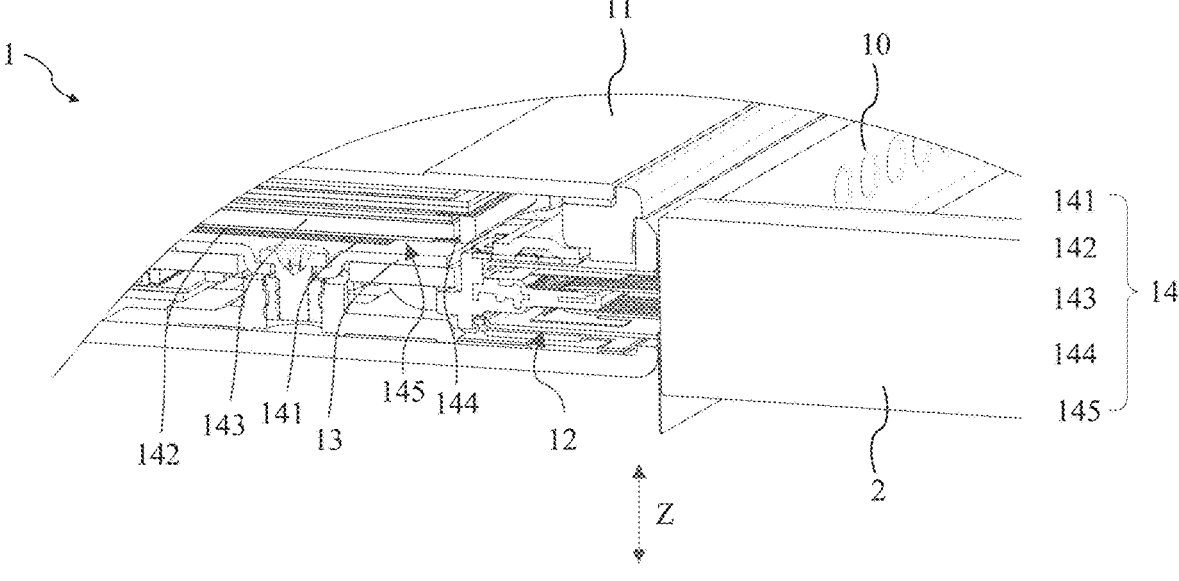
FIG. 6B is a fourth partially enlarged view of a tablet computer from a perspective of a sectional view according to some embodiments of this application.

As shown in FIG. 6A and FIG. 6B, in the thickness direction (as shown by a Z direction in FIG. 6A and FIG. 6B), there is a notch (that is, the notch 145) directly above the compression structure 13 of the USB-type C connector 12. For example, the notch 145 exposes the reflection sheet 142 on the backlight assembly 14 and the fastening tape 144 on the light guide plate 143. The notch 145 forms avoidance space in the Z direction, so that a thickness of the tablet computer 1 in the thickness direction can be reduced. To be specific, after the thickness of the tablet computer 1 is reduced, a security gap between the compression structure 13 of the USB-type C connector 12 and the backlight assembly 14 is ensured, a possibility of mutual interference between the compression structure 13 and the backlight assembly 14 in the Z direction is reduced, and a risk of poor display existing during use of the tablet computer 1 is reduced.

Figure 7A:
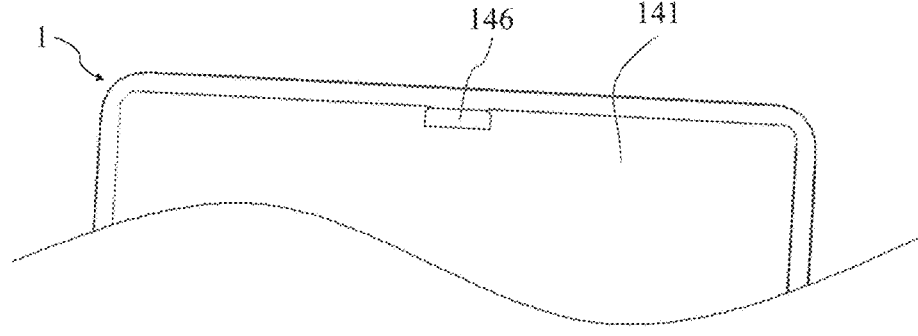
FIG. 7A is a first partially enlarged view at a location that is on a back plate in a display module and that corresponds to a USB type C connector according to some embodiments of this application.
Figure 7B:
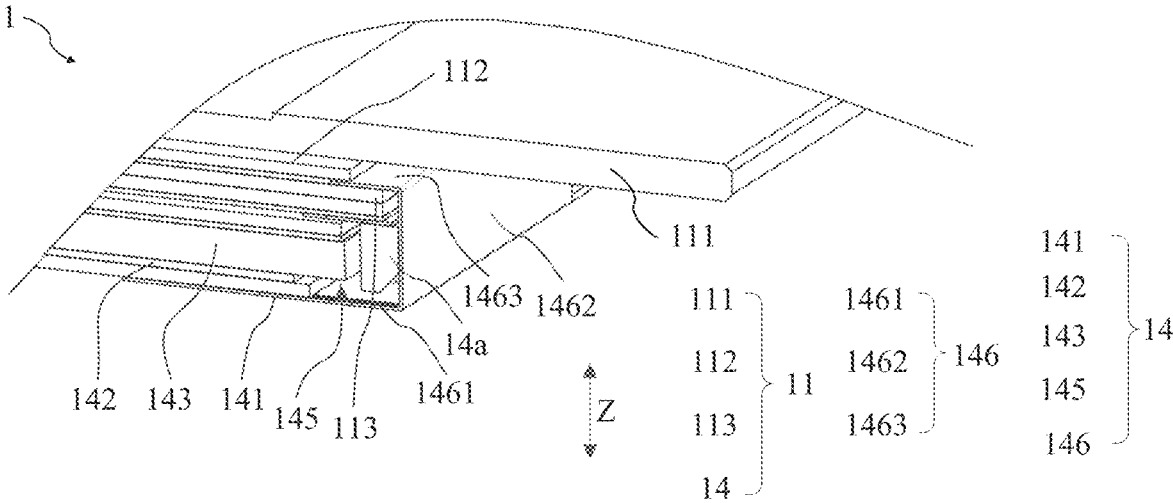
FIG. 7B is a first partially enlarged view of a display module from a three-dimensional perspective according to some embodiments of this application.

In some possible implementations, referring to FIG. 7A and FIG. 7B, the backlight assembly 14 in the display module 11 in this embodiment of this application further includes a light shielding member 146, and the light shielding member 146 is connected to the back plate 141 and is configured to wrap the notch 145. After the light shielding member 146 is disposed, the following cases may be avoided: (1) Backlight is exposed at the provided notch, and a foreign object easily enters the backlight, causing display of defects such as a white spot, a white mass, or a foreign object. (2) Backlight is exposed at the provided notch, the backlight is emitted, and a defect of light leakage occurs in an entire device. In other words, after the light shielding member 146 is disposed, the light shielding member 146 is added at the notch 145 on the back plate 141 to wrap the notch, to prevent a foreign object from entering the backlight assembly 14 and further shield light.

For example, the light shielding member 146 is a black Mylar sheet, that is, the black Mylar sheet is used to wrap the notch on the back plate 141. In other words, the back plate 141 is provided with the notch to avoid the compression structure 13 of the USB type C connector 12, and a thickness of an entire device is further reduced. In addition, dustproof Mylar is used to wrap the notch to eliminate a risk of foreign object entry.

Still referring to FIG. 7B, the light shielding member 146 includes a first part 1461, a second part 1462, and a third part 1463 that are connected. The display module 11 further includes cover glass 111, an optically clear adhesive 112, and a liquid crystal panel 113 that are stacked from top to bottom in the thickness direction, and the liquid crystal panel 113 is adhered to an adhesive frame 14a. The first part 1461 of the light shielding member 146 is connected to a side that is of the back plate 141 of the backlight assembly 14 in the display module 11 and that is away from the reflection sheet 142, the second part 1462 is connected to a side surface (for example, the adhesive frame 14a) of the backlight assembly 14, and the third part 1463 is connected to a side that is of the liquid crystal panel 113 and that faces the cover glass 111. In other words, in the thickness direction (as shown by a Z direction in FIG. 7B), the first part 1461 and the third part 1463 of the light shielding member 146 are spaced apart, and the second part 1462 is separately connected to the first part 1461 and the third part 1463. Therefore, the light shielding member 146 can wrap the notch 145 on the back plate 141, to prevent a foreign object from entering the backlight assembly 14 from the notch 145.

Figure 8A:
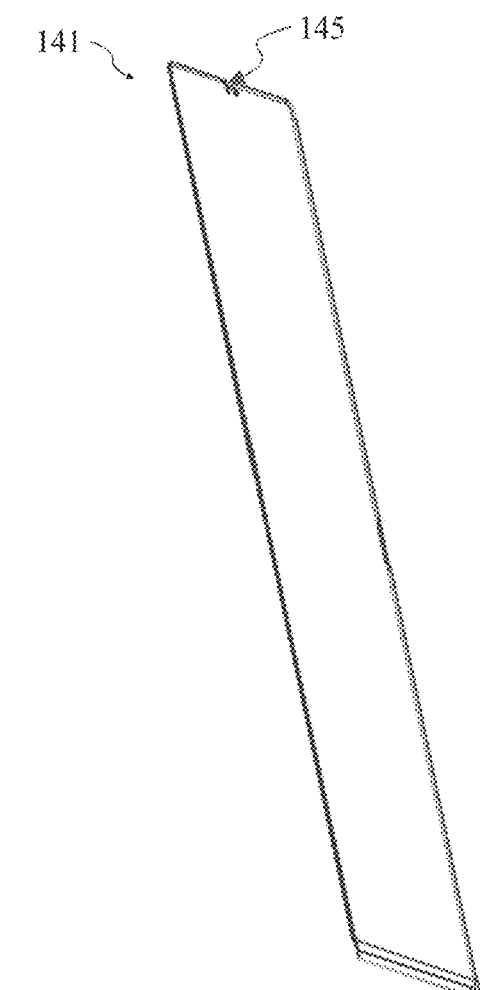
FIG. 8A is a first three-dimensional diagram of a back plate in a display module according to some embodiments of this application.
Figure 8B:
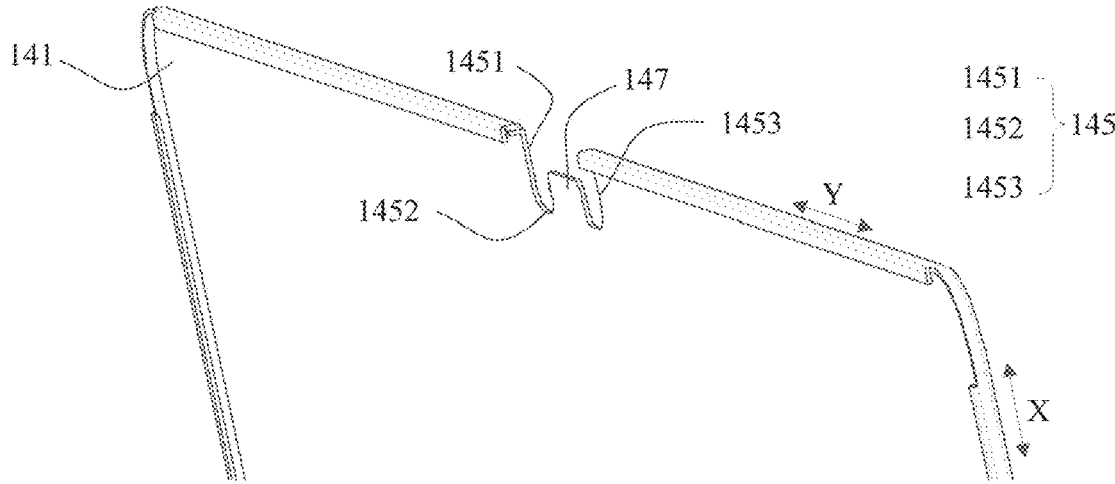
FIG. 8B is a second three-dimensional diagram of a back plate in a display module according to some embodiments of this application.
Figure 9:
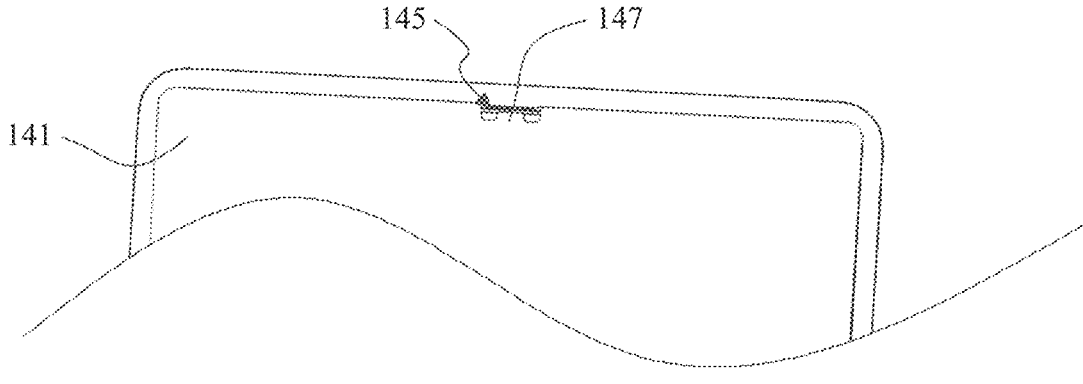
FIG. 9 is a second partially enlarged view at a location that is on a back plate in a display module and that corresponds to a USB type C connector according to some embodiments of this application.

FIG. 8A is a first three-dimensional diagram of the back plate 141 according to an embodiment of this application, FIG. 8B is a second three-dimensional diagram of the back plate 141 according to an embodiment of this application, and FIG. 9 is a first partially enlarged view at the notch 145 on the back plate 141 according to an embodiment of this application.

As described above, because the back plate 141 is provided with the notch 145, after the notch 145 is disposed, there is no Z-direction support and protection for an internal film material at the provided notch. During a reliability test of an entire device, for example, during falling, the light guide plate 143 may swing and hit an external structural member, which is prone to cause a problem of cracking of the light guide plate 143. Therefore, in some possible implementations, as shown in FIG. 8B and FIG. 9, a convex lug 147 is disposed at the notch 145 on the back plate 141 in this embodiment of this application, and the convex lug 147 is configured to support the light guide plate 143 in the light emitting direction. The design of the convex lug 147 is used at the notch 145 on the back plate 141, which reduces a risk of film material deformation and cracking of light guide plate 143 in a falling process of the tablet computer 1.

In some possible implementations, the convex lug 147 is further configured to support the reflection sheet 142 in the light emitting direction.

A specific shape of the convex lug 147 is not limited in this application. In some possible implementations, referring to FIG. 8B, the notch 145 on the back plate 141 includes a first sidewall 1451, a bottom wall 1452, and a second sidewall 1453 that are sequentially connected. The bottom wall 1452 extends in a width direction (as shown by a Y direction in FIG. 8B), and the first sidewall 1451 and the second sidewall 1453 are disposed opposite to each other in the width direction and separately extend in a length direction (as shown by an X direction in FIG. 8B). The convex lug 147 in this embodiment of this application extends in length direction and protrudes from the bottom wall 1452 in the width direction.

For example, the convex lug 147 is separately spaced apart from the first sidewall 1451 and the second sidewall 1453 in the width direction. For example, intervals between the convex lug 147 and the first sidewall 1451 and the second sidewall 1453 are used to avoid the compression structure 13 of the USB type C connector 12. Therefore, the convex lug 147 at the notch 145 on the back plate 141 supports the light guide plate 143, and the notch 145 on the back plate 141 avoids the compression structure 13 of the USB type C connector 12, thereby ensuring a security gap.

In some possible implementations, the convex lug 147 is separately shorter than the first sidewall 1451 and the second sidewall 1453 in the width direction. Through this disposing, the compression structure 13 of the USB type C connector 12 can also be avoided.

Figure 10:
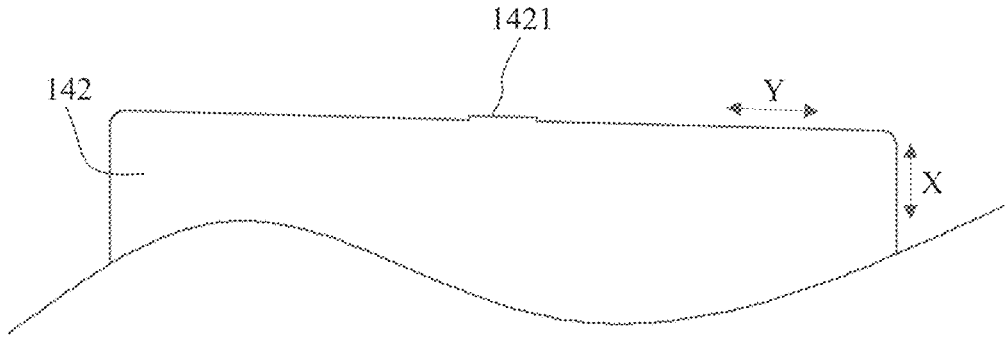
FIG. 10 is a partially enlarged view of a reflection sheet in a display module according to some embodiments of this application.
Figure 11:
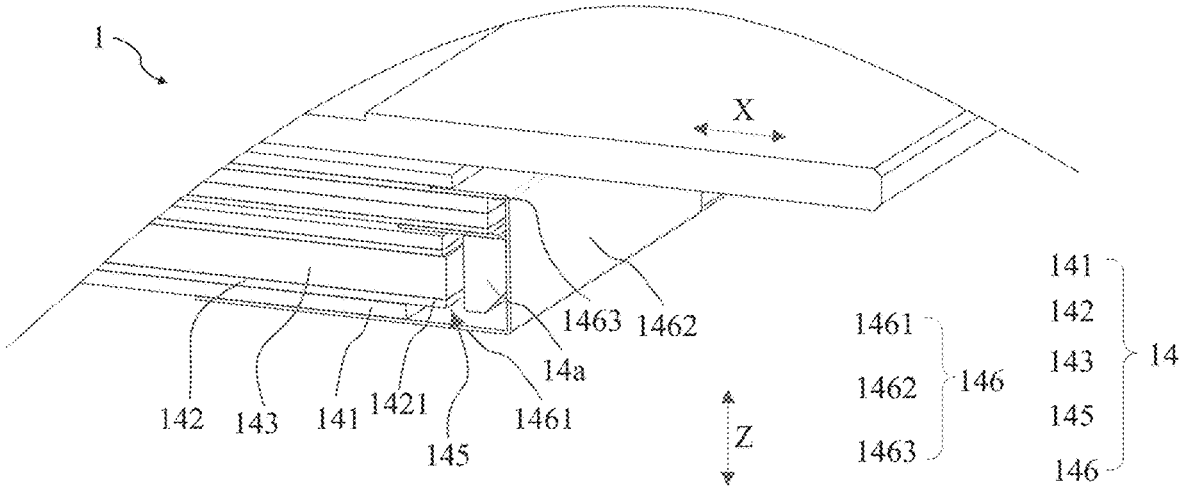
FIG. 11 is a second partially enlarged view of a display module from a three-dimensional perspective according to some embodiments of this application.
Figure 12:
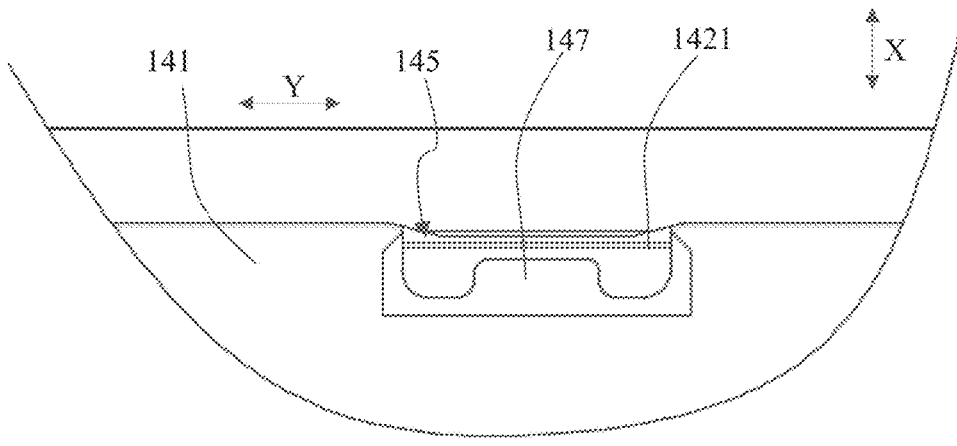
FIG. 12 is a third partially enlarged view at a location that is on a back plate in a display module and that corresponds to a USB type C connector according to some embodiments of this application.

FIG. 10 is a three-dimensional diagram of the reflection sheet 142 according to an embodiment of this application, FIG. 11 is a three-dimensional diagram of the display module 11 according to an embodiment of this application, and FIG. 12 is a second partially enlarged view at the notch 145 on the back plate 141 according to an embodiment of this application.

In a mechanical reliability process of the tablet computer 1, the light guide plate 143 drives the reflection sheet 142 to displace. Although the light guide plate 143 is fastened through the fastening tape 144, relative displacement between the light guide plate 143 and the reflection sheet 142 after falling cannot be completely avoided. After a falling test, the reflection sheet 142 is displaced, and the reflection sheet 142 moves relative to a location of the light guide plate 143. The notch 145 on the back plate 141 may be unable to reflect light upward, resulting in a local blackening visible to eyes. Consequently, a display problem may occur in the display module 11 of the tablet computer 1. In addition, at the provided notch, there is no back adhesive to adhere the reflection sheet 142 to the back plate 141, and problems such as displacement and wrinkles easily occur during falling, resulting in abnormal display.

Therefore, referring to FIG. 10 to FIG. 12, in this embodiment of this application, a protrusion 1421 is disposed at a location that is on the reflection sheet 142 and that corresponds to the notch 145, and in the light emitting direction, projections of the reflection sheet 142 and the protrusion 1421 at least partially cover a projection of the notch 145.

That is, the reflection sheet 142 in this embodiment of this application is designed in an irregular shape, and the reflection sheet 142 protrudes locally at the provided notch. Even if the reflection sheet 142 is displaced during falling of the tablet computer 1, a protruding part (that is, the protrusion 1421) on the reflection sheet 142 can still cover the notch (that is, the notch 145) on the back plate 141, so that the reflection sheet 142 provides sufficient reflected light, and no abnormal display occurs. For example, a reflection back adhesive at the provided notch on the back plate 141 may be removed, to design the reflection sheet 142 in the irregular shape. Only an appearance shape of the reflection sheet 142 is optimized, and there is no additional fixture costs.

For example, in the light emitting direction, the projections of the reflection sheet 142 and the protrusion 1421 completely cover the projection of the notch 145. For example, in the length direction, the protrusion 1421 on the reflection sheet 142 is disposed protruding from the convex lug 147. The protrusion 1421 added to the reflection sheet 142 covers the entire notch 145 on the back plate 141, and the fastening tape 144 of the light guide plate 143 is not visible at the notch 145 on the back plate 141. This disposing helps the reflection sheet provide sufficient reflected light.

Figure 13:
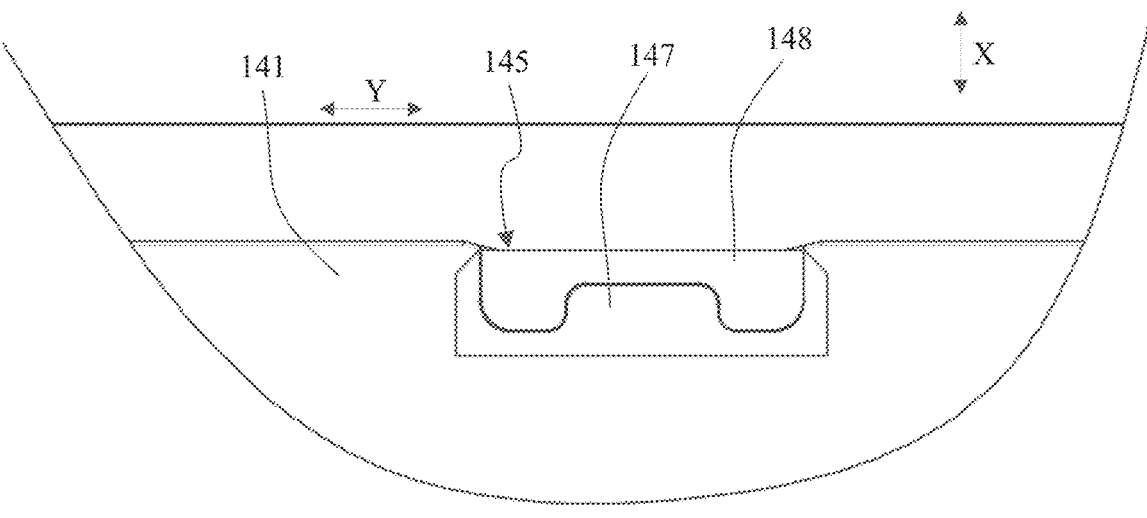
FIG. 13 is a fourth partially enlarged view at a location that is on a back plate in a display module and that corresponds to a USB type C connector according to some embodiments of this application.
Figure 14:
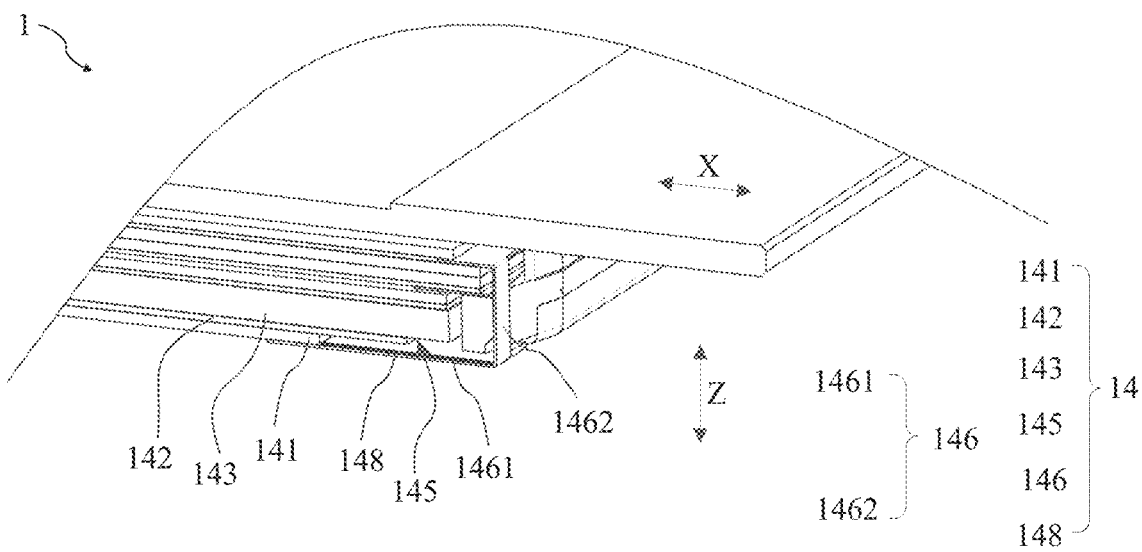
FIG. 14 is a third partially enlarged view of a display module from a three-dimensional perspective according to some embodiments of this application.

In addition, in some possible implementations, referring to FIG. 13 and FIG. 14, a white PET layer 148 is disposed at a location that is on the light shielding member 146 and that corresponds to the notch 145, and in the light emitting direction, a projection of the white PET layer 148 (polyethylene terephthalate) at least partially covers a projection of the notch 145. The white PET layer 148 is disposed on an inner wall of the dustproof Mylar that is added at the location of the provided notch. Even if the reflection sheet 142 is displaced during falling of the tablet computer 1, the white PET layer 148 can still provide enough reflected light. In other words, light may be reflected upward through the white PET layer 148, a display effect is not affected, and no abnormal display occurs. In other words, when the white PET layer 148 is disposed in the dustproof Mylar, a display problem caused by displacement of the reflection sheet 142 during falling can also be avoided.

For example, in the light emitting direction, the projection of the white PET layer 148 completely covers the projection of the notch 145. For example, in the length direction, the white PET layer 148 is disposed protruding from the convex lug 147.

In summary, in the display module in the embodiments of this application, the back plate is provided with the notch to avoid the compression structure of the USB type C connector, so that a thickness of an entire device is further reduced. Black Mylar is added at the location of the provided notch, to prevent a foreign object from entering the back plate, and further shield light. Appearance of the provided notch on the back plate is optimized, and the convex lug design is locally added to support an inner film of the display module, thereby reducing a risk of film material deformation of and cracking of the light guide plate during falling. For a display problem caused by displacement of the reflection sheet, the reflection sheet is designed convexly or the white PET layer is disposed in the dustproof Mylar, to avoid a display problem caused by displacement of the reflection sheet during falling.

The invention claimed is:
1. A display, comprising:
a back plate;
a reflection sheet;
a light guide plate; and
a light shielding member;

wherein a direction in which the reflection sheet points to the light guide plate is a light emitting direction of the display, and in the light emitting direction, the reflection sheet is disposed between the back plate and the light guide plate;

wherein in the light emitting direction, the back plate is configured to be disposed above a universal serial bus (USB) connector, and a notch is disposed at a location that is on the back plate and that corresponds to the USB connector;

wherein the light shielding member is connected to the back plate and wraps the notch; and wherein a protrusion is disposed at a location that is on the reflection sheet and that corresponds to the notch, and in the light emitting direction, projections of the reflection sheet and the protrusion at least partially cover a projection of the notch.

2. The display according to claim 1, wherein the light shielding member comprises a first part and a second part that are connected, the first part is connected to a side of the back plate that is away from the reflection sheet, and the second part is connected to a side surface of the display, to wrap the notch to prevent a foreign object from entering the display from the notch.

3. The display according to claim 1, wherein the light shielding member is a black film material.

4. The display according to claim 1, wherein a convex lug is disposed at the notch on the back plate, and the convex lug is configured to support the light guide plate in the light emitting direction.

5. The display according to claim 4, wherein the convex lug is further configured to support the reflection sheet in the light emitting direction.

6. The display according to claim 4, wherein the notch comprises a first sidewall, a bottom wall, and a second sidewall that are sequentially connected;

wherein the bottom wall extends in a first direction;

wherein the first sidewall and the second sidewall are disposed opposite to each other in the first direction and separately extend in a second direction, the first direction and the second direction intersect, and the light emitting direction is separately perpendicular to the first direction and the second direction; and wherein the convex lug extends in the first direction, and protrudes from the bottom wall in the second direction.

7. The display according to claim 6, wherein in the first direction, the convex lug is separately spaced apart from the first sidewall and the second sidewall.

8. The display according to claim 7, wherein intervals between the convex lug and the first sidewall and the second sidewall are used to avoid a compression structure of the USB connector.

9. The display according to claim 6, wherein in the second direction, the convex lug is separately shorter than the first sidewall and the second sidewall, to avoid the compression structure of the USB connector.

10. The display according to claim 1, wherein in the light emitting direction, the projections of the reflection sheet and the protrusion completely cover the projection of the notch.

11. A display, comprising:

a back plate;

a reflection sheet;

a light guide plate; and a light shielding member;

wherein a direction in which the reflection sheet points to the light guide plate is a light emitting direction of the display, and in the light emitting direction, the reflection sheet is disposed between the back plate and the light guide plate;

wherein in the light emitting direction, the back plate is configured to be disposed above a universal serial bus (USB) connector, and a notch is disposed at a location that is on the back plate and that corresponds to the USB connector;

wherein the light shielding member is connected to the back plate and wraps the notch; and wherein a white polyethylene terephthalate (PET) layer is disposed at a location that is on the light shielding member and that corresponds to the notch, and in the light emitting direction, a projection of the white PET layer at least partially covers a projection of the notch.

12. The display according to claim 11, wherein in the light emitting direction, the projection of the white PET layer completely covers the projection of the notch.

13. An electronic device, comprising:

a universal serial bus (USB) connector that includes a compression structure; and a display, wherein the display comprises a back plate, a reflection sheet, a light guide plate, and a light shielding member;

wherein a direction in which the reflection sheet points to the light guide plate is a light emitting direction of the display, and in the light emitting direction, the reflection sheet is disposed between the back plate and the light guide plate;

wherein in the light emitting direction, the back plate is configured to be disposed above the USB connector, and a notch is disposed at a location that is on the back plate and that corresponds to the USB connector;

wherein the light shielding member is connected to the back plate and wraps the notch;

wherein in the light emitting direction of the display, the back plate of the display is disposed above the USB connector, and the notch is located above the compression structure of the USB connector; and wherein a convex lug is disposed at the notch on the back plate, and the convex lug is configured to support the light guide plate in the light emitting direction.

14. The electronic device according to claim 13, wherein the light shielding member comprises a first part and a second part that are connected, the first part is connected to a side of the back plate that is away from the reflection sheet, and the second part is connected to a side surface of the display, to wrap the notch to prevent a foreign object from entering the display from the notch.

15. The electronic device according to claim 13, wherein the light shielding member is a black Mylar sheet film material.

16. The electronic device according to claim 13, wherein the convex lug is further configured to support the reflection sheet in the light emitting direction.

17. The electronic device according to claim 13, wherein the notch comprises a first sidewall, a bottom wall, and a second sidewall that are sequentially connected;

wherein the bottom wall extends in a first direction;

wherein the first sidewall and the second sidewall are disposed opposite to each other in the first direction and separately extend in a second direction, the first direction and the second direction intersect, and the light emitting direction is separately perpendicular to the first direction and the second direction; and wherein the convex lug extends in the first direction, and protrudes from the bottom wall in the second direction.

18. The electronic device according to claim 17, wherein in the first direction, the convex lug is separately spaced apart from the first sidewall and the second sidewall.

* * * * *